United States Patent [19]

White et al.

[11] Patent Number: 4,958,347
[45] Date of Patent: Sep. 18, 1990

[54] APPARATUS, METHOD AND DATA STRUCTURE FOR VALIDATION OF KERNEL DATA BUS

[75] Inventors: Bruce T. White, Woodinville; John D. Polstra, Seattle; Craig V. Johnson, Everett, all of Wash.

[73] Assignee: John Fluke Mfg. Co., Inc., Everett, Wash.

[21] Appl. No.: 275,185

[22] Filed: Nov. 23, 1988

[51] Int. Cl.⁵ .............................................. G01R 31/28
[52] U.S. Cl. .................................. 371/29.5; 371/16.2; 371/68.1; 371/68.3
[58] Field of Search ................. 371/21.2, 21.3, 29.5, 371/68.1, 68.2, 68.3, 69, 70, 16.2

[56] References Cited

U.S. PATENT DOCUMENTS

| | | | |
|---|---|---|---|
| 3,289,160 | 11/1966 | Carter et al. | 371/29.5 |
| 4,055,801 | 10/1977 | Pike | 371/25.1 |
| 4,108,358 | 8/1978 | Niemaszyk | 371/22.1 |
| 4,139,818 | 2/1979 | Schneider | 324/73 R |
| 4,192,451 | 3/1980 | Swerling | 371/22.4 |
| 4,402,055 | 8/1983 | Lloyd | 371/15.1 |
| 4,550,406 | 10/1985 | Neal | 371/22.6 |
| 4,567,592 | 1/1986 | Minicilli | 371/16.2 |
| 4,607,366 | 8/1986 | Stadlmeier et al. | 371/16.1 |
| 4,622,647 | 11/1986 | Sagnard et al. | 371/16.2 |
| 4,622,669 | 11/1986 | Pri-Tal | 371/29.5 |
| 4,641,207 | 2/1987 | Green et al. | 371/16.2 |
| 4,641,348 | 2/1987 | Neuder | 382/1 |
| 4,656,632 | 4/1987 | Jackson | 371/27 |
| 4,687,988 | 8/1987 | Eichelberger | 371/22.3 |
| 4,691,316 | 9/1987 | Phillips | 371/16.2 |
| 4,752,929 | 6/1988 | Kantz et al. | 371/21.2 |
| 4,757,503 | 7/1988 | Hayes et al. | 371/68.1 |
| 4,847,838 | 7/1989 | Kralik | 371/29.5 |

Primary Examiner—Charles E. Atkinson
Attorney, Agent, or Firm—Stephen A. Becker; Marshall M. Curtis

[57] ABSTRACT

An apparatus, method and data structure for validating the data bus of a microprocessor-based unit under test in which bit patterns having half as many bits as the width of the data bus are applied to the data bus along with another bit pattern which is either the complemented or true replication of the bit pattern. Evaluation of the resulting bit patterns on the data bus permits a validation of the entire width of the data bus which, if no faults are reported, obviates not only probing of the data bus by the operator but data bus diagnosis, as well. A particular data structure of a preferred bit pattern sequence avoids any fault on any data line being reported as a pass.

10 Claims, 4 Drawing Sheets

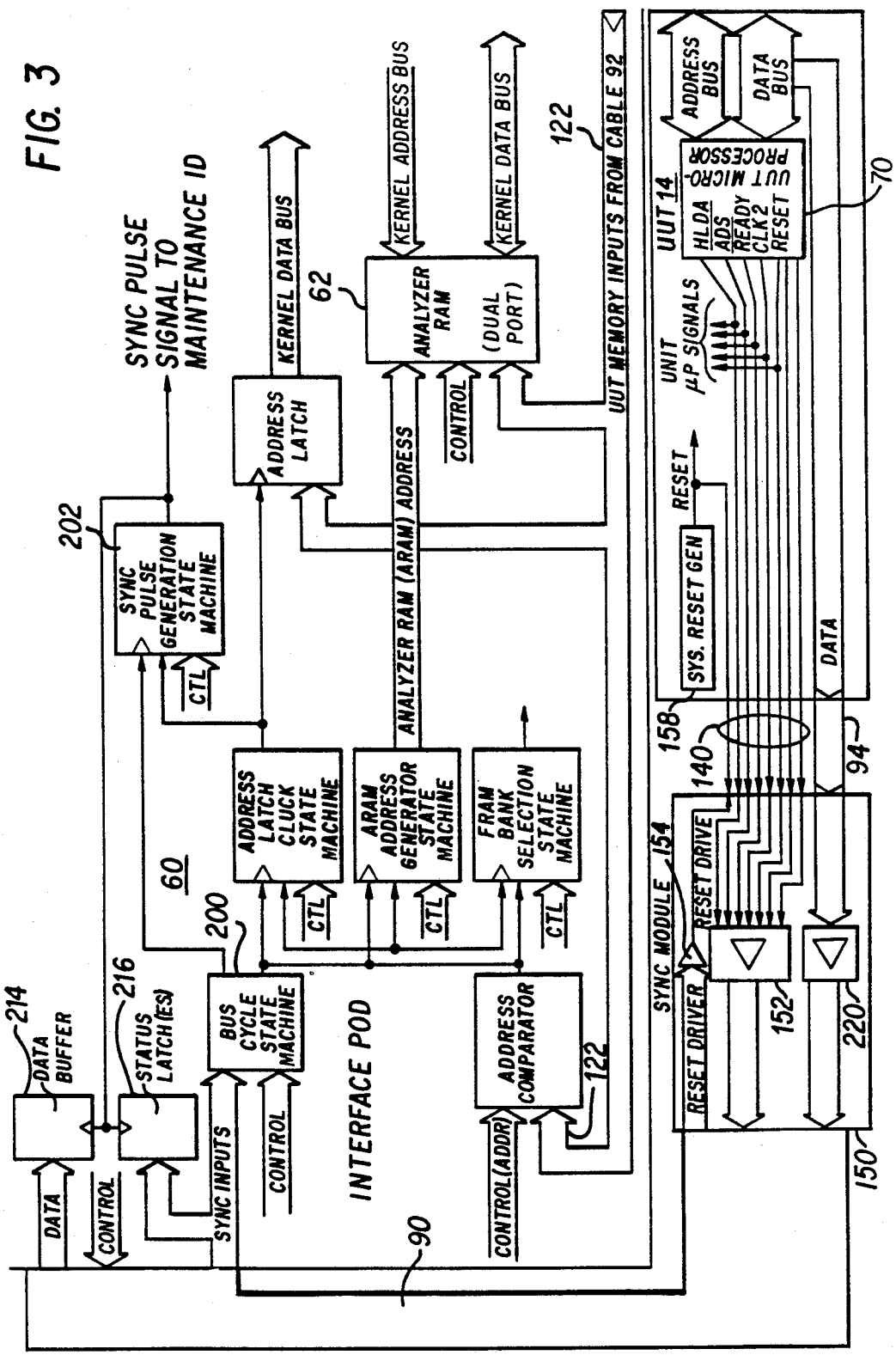

APPARATUS, METHOD AND DATA STRUCTURE FOR VALIDATION OF KERNEL DATA BUS

Cross-reference to Related Applications

This application is related to concurrently filed U.S. Ser. No. 07/275,495 KERNEL TESTING INTERFACE AND METHOD FOR AUTOMATING DIAGNOSTICS OF MICROPROCESSOR-BASED SYSTEMS by J. Polstra, M. Scott and B. White, U.S. Ser. No. 07/275,184 HARDWARE ENHANCEMENTS FOR IMPROVED PERFORMANCE OF MEMORY EMULATION METHOD by T. Locke and U.S. Pat. No. 07/275,183 AUTOMATIC VERIFICATION OF KERNEL CIRCUITRY BASED ON ANALYSIS OF MEMORY ACCESSES by J. Polstra, all assigned to the assignee of the present invention.

Technical Field

The present invention relates generally to the testing and troubleshooting of microprocessor-based electronic systems and more particularly to testing and troubleshooting of the kernel of microprocessor-based electronic systems using a memory emulation technique.

Background of the Invention

With the wide use of complex microprocessor-based systems in both consumer and industrial products, automation of testing and diagnosis of circuit faults, particularly of the kernel of such systems, has become extremely desireable. The kernel of such a system is well-understood in the art to refer to the microprocessor ($\mu P$), itself, and the associated elements with which it is necessary for the microprocessor to correctly interact to function correctly, specifically the memory, clock, address bus and data bus. So-called emulative testers in which an element of the kernel is emulated by the testing apparatus have become popular for functional testing because they enable detailed diagnostics of the kernel even where the kernel is not even minimally operative.

One type of emulative tester is a microprocessor emulator, exemplified by the tester described in U.S. Pat. No. 4,455,654, issued to K. S. Bhaskar et al and assigned to the John Fluke Mfg. Co., Inc.; In that system, connection is made to the UUT by removing the UUT $\mu P$ and connecting the test system through the $\mu P$ socket of the UUT.

Another type of emulative tester is a ROM (or memory) emulator. ROM emulation is deemed desireable since the ROM is in direct communication with the UUT data and address buses and the pin configurations of ROM sockets are relatively simple. ROM emulators are well known for use in software design and operational verification of the $\mu P$ but have only recently been used for fault detection and diagnosis because no sync signal is typically available to synchronize the test equipment with the test results it receives. A solution to this problem is disclosed in U.S. Pat. application No. 07/158,223, of M. H. Scott et al, filed Feb. 19, 1988, for MEMORY EMULATION METHOD AND SYSTEM FOR TESTING AND TROUBLESHOOTING MICROPROCESSOR-BASED ELECTRONIC SYSTEMS, and is hereby fully incorporated by reference herein. That test system comprises a $\mu P$-based mainframe and an interface pod which also includes a $\mu P$-based system which is connected to both the $\mu P$ and the memory socket of the UUT. The interface pod includes special logic circuitry connected to the UUT $\mu P$ to provide a fine resolution sync signal pulse during a bus cycle of interest in order to provide full troubleshooting fault isolation that is as effective as that provided by prior art $\mu P$ emulation since the high resolution sync pulse derived from the $\mu P$ can be used to isolate and evaluate signals monitored from the address and data buses at the memory socket with the same facility as they could be from $\mu P$ connections. Also, as disclosed in that application, ROM emulation may be generalized to memory emulation (e.g. the emulation of any memory or portion of memory) since the trend in $\mu P$-based systems is to increase RAM while reducing ROM and possibly eliminating ROM altogether by substituting RAM. Therefore test systems must be adequately generalized to test systems not yet produced but, nonetheless, foreseeable in light of current trends in electronic microprocessor-based system architecture.

It will be important to understand the distinction between terms indicating different degrees of certainty of funtionality provided by different testing procedures. The term "verification", as used herein indicates the ascertaining of at least a minimum level of functionality which is sufficient to allow a subsequent procedure to be conducted. The term "validation" indicates that if no fault is found, the entire structure validated may be considered fully funtional. The term "test" is used to indicate a procedure where all existing faults will be found, but not necessarily isolated or identified. "Diagnosis", as used herein, indicates that all faults are found and identified.

As disclosed in the above noted copending application, KERNEL TESTING INTERFACE AND METHOD FOR AUTOMATING DIAGNOSTICS OF MICROPROCESSOR-BASED SYSTEMS, by Polstra et al, which is hereby fully incorporated by reference, a highly automated testing and diagnostics system and method has been provided in which the data bus is merely verified prior to performance of the address bus test and diagnosis Verification provides a lesser degree of certainty of full functionality of the data bus since, for verification, the data bus is exercised and tested on to the extent necessary to determine that it is sufficiently functional to carry out testing and diagnosis of the address bus. Specifically, only a fraction of the data bus lines must function correctly. The reason for performing verification rather than testing of the data bus, as disclosed in the copending Polstra et al application, is to reduce the time necessary to perform complete diagnosis of the kernel of the UUT. The single slowest element of the test is the test of the upper data bus which has required manual probing by the operator of the test system for data bus testing and diagnosis. During testing by memory emulation, signals which reflect the condition of the kernel are collected from the address by the emulation memory. Therefore, unless the data bus functions correctly, such signals will be ambiguous as to whether a fault found exists on the data bus or the address bus. Testing of the address bus requires no probing and takes little time and if no fault is found, both the data bus and the address bus will be found to be fully functional. Accordingly, it is desireable to do test the data bus after testing the address bus and then only when a fault has been indicated at some point in the kernel. Further, it remains desireable to be able to eliminate probing, since it is time-consuming and requires greater skill on the part of the test system operator.

OBJECTS OF THE INVENTION

Accordingly, it is an object of this invention to provide apparatus for testing microprocessor-based system performing data bus validation without the requirement of probing the lines of the data bus.

It is another object of the invention to provide a method for validation of the entire data bus of a microprocessor-based system under test without probing.

It is a further object of this invention to provide, in an apparatus for testing microprocessorbased systems, a test sitmulus routine which will function as a go/no go test of the data bus to permit address bus testing and diagnosis to be performed prior to data bus diagnosis, should no fault in the data bus be reported.

It is yet another object of the invention to provide, in an apparatus for testing microprocessorbased systems, a validation routine which eliminates the need for data bus diagnosis should no fault be found in the process of the validation routine.

DISCLOSURE OF THE INVENTION

The invention is directed to an apparatus for testing and validation of the data bus of the kernel of a microprocessor-based system by memory emulation, including a method for validation of the data bus. First, a load operation is performed to force onto a first plurality of lines of the data bus a first bit pattern containing a number of bits equal to one-half the number of lines in the data bus. Next, a load operation is performed of a second bit pattern which is the complement of said first bit pattern over a second plurality of bus lines constituted by the remainder of the data bus lines. Whereupon, the first and second bit patterns are compared and a signal is generated if the second bit pattern is not the complement of the first bit pattern. These steps are preferably repeated a number of times. Then, in a similar fashion, a load operation of a third bit pattern containing a number of bits equal to one-half the number of lines in the data bus over a third plurality of lines in the data bus is performed and as is a load operation of a fourth bit pattern which is not the complement of the third bit pattern over a fourth plurality of bus lines constituted by the remainder of the data bus lines. Then said third and fourth bit patterns are compared and a signal is generated if the fourth bit pattern is not the complement of the third bit pattern. These steps are also preferably repeated a number of times. The data bus can then be validated based upon the results of the comparisons.

As will be evident, the first and second pattern could be simultaneously loaded, perhaps in a single operation, as may be convenient, as can the third and fourth patterns. However, it may not be convenient to do so if the second and fourth patterns are respectively developed from the first and third patterns rather than stored.

By implementing this routine in an apparatus for testing microprocessor-based system kernels, The data bus may be entirely validated and the overall test procedure may be greatly expedited since the validation routine obviate the need for probing of the data bus lines if no fault is reported.

The above and other objects of the invention will become evident to those skilled in the art from the following detailed description of the invention with reference to the accompanying drawings.

BEST MODE OF PRACTICING THE INVENTION

Overview

Figure 1:
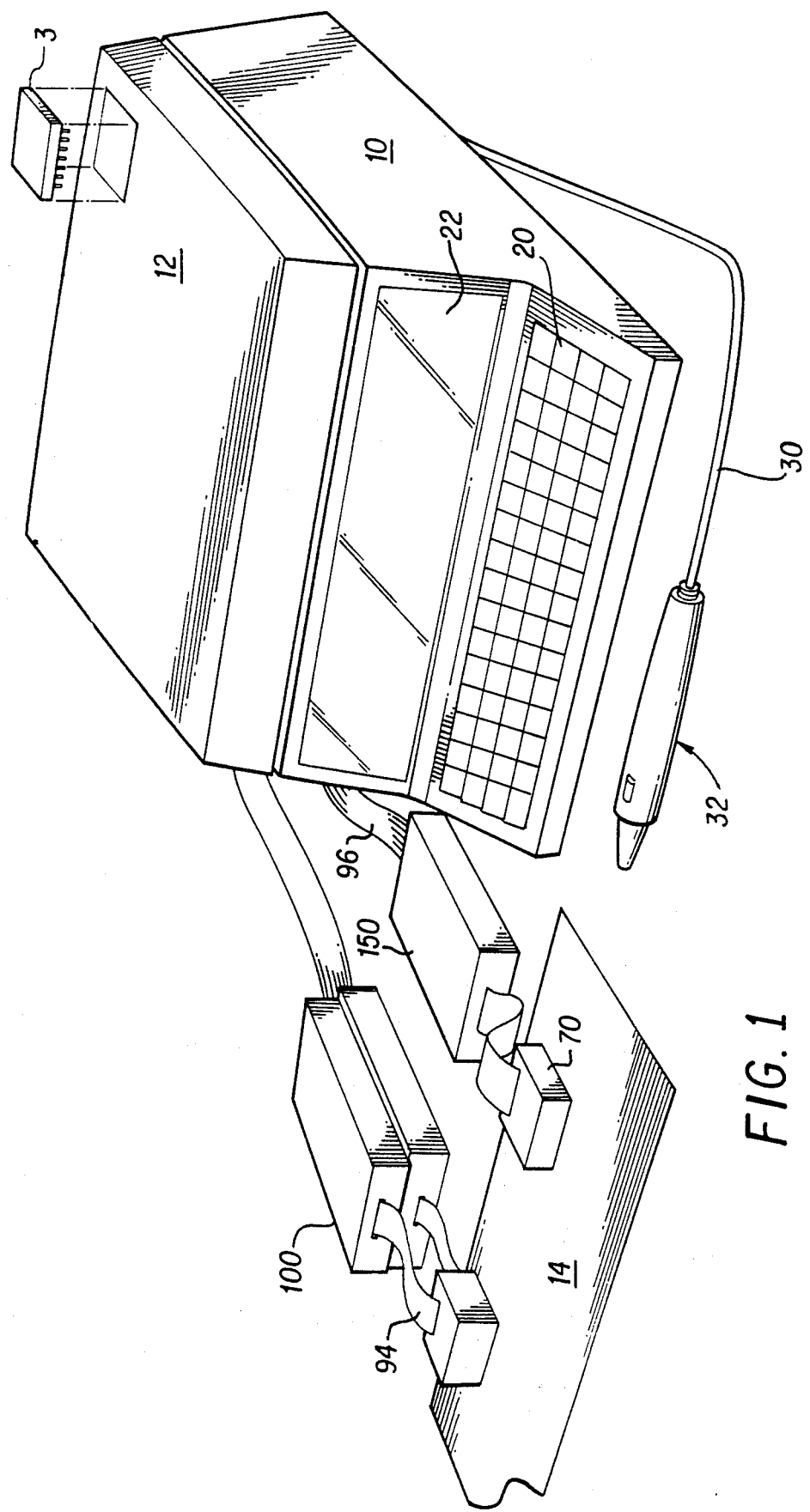
FIG. 1 is an illustration of a microprocessor-based testing apparatus incorporating this invention.
Figure 2:
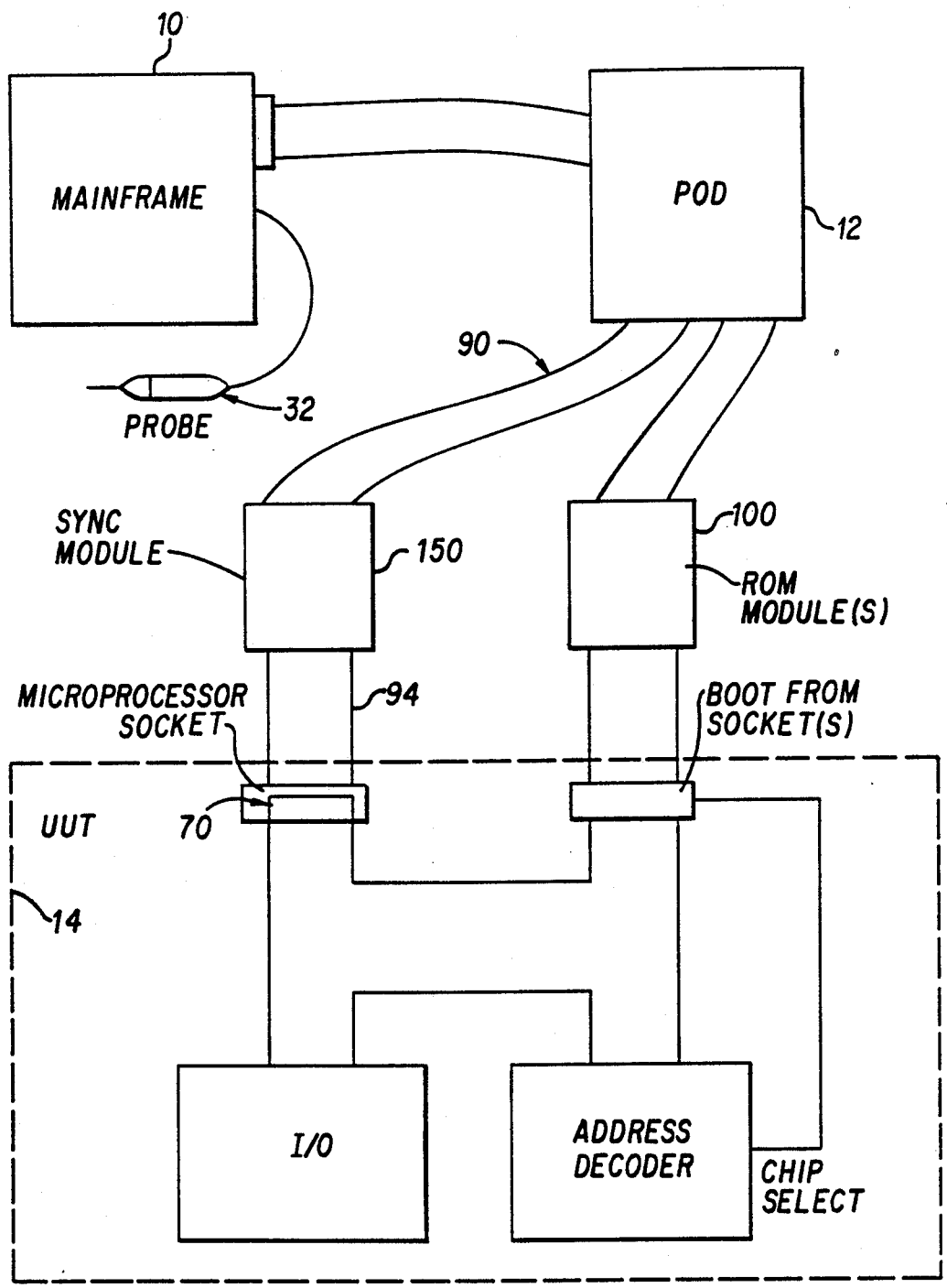
FIG. 2 is a simplified block diagram of the system shown in FIG. 1.

As an overview of the invention, with reference to FIG. 1, test apparatus connected to a UUT 14 includes a mainframe processor 10, arranged in a compact housing and including a keyboard 20, probe 32 and display 22, an interface pod 12, a sync module 150 including a sync module adapter 150 and at least one memory module 100 (two being illustrated) depending upon the memory configuration of the UUT 14. The memory module(s) connect to the UUT by a multi- conductor cable 92 and a plug corresponding to the UUT memory socket 72. FIG. 2 schematically illustrates the interconnection of the system shown in FIG. 1, showing the preferred arrangement of the apparatus in a plurality of housings. It is to be understood that the particular articulation of the elements of the system while being preferably as shown for the convenience of the operator could be packaged in more or fewer elements than shown. For instance, the pod could be entirely included within the same housing as the mainframe. It is also to be noted in FIG. 2 that while the memory module is electrically substituted for the UUT memory, either by physical replacement or by parallel connection while disabling the UUT memory, the sync module is connected to the µP which is left in place in the UUT circuit.

The validation routine of this invention comprises a stimulus routine including passing a bit pattern which is half as wide as the data bus, or the portion of the data bus to be validated, over, say, the low order lines of the data bus, or portion thereof, and passing the same bit pattern or complement of that bit pattern over the high order lines of the data bus, or portion, and evaluating the bit patterns received on the respective high and low order lines to determine whether the bit patterns are or are not complements of each other. Since the patterns are both true and complemented patterns, differing results of the evaluation are sufficient to validate the entire width of the data bus.

Detailed Description

With the above brief overview of the invention in mind, operation of the system described in the copending applications, supra, will be reviewed as a background for understanding the operation of the enhancements constituting the invention.

The testing system includes a plurality of novel procedures including a bus test primitive, a data stimulus primitive and an address stimulus primitive, which will be individually summarized below. Each of these primitives has utility for testing a particular portion of the kernel of a µP-based system and when utilized in a sequence according to the invention permit a higher degree of automated testing and diagnostics at higher speed and with greater operator convenience than has heretofore been available.

The bus test primitive is executed by a program in the mainframe of the test apparatus. The main function of the bus test primitive is to determine if the μP is able to perform basic read and write operations in the kernel and can consist of as little as a single read and write. If successful, it will be known that the μP is at least capable of accessing the memory, in this case, the emulation memory, receiving a bit pattern over the data bus and placing that bit pattern on the address bus where it can be received and monitored by the pod. Since the testing apparatus performs diagnostics of the data and address buses by the development of signatures, however, in the preferred embodiment, the bus test primitive is implemented as a program which is designed to exercise the portion of the data and address buses which correspond to the boot memory. Whether implemented as a single operation or a sequence of operations, it is significant that the bus test primitive is not exhaustive of the lines comprising the data and address buses or even of the combinations of bits which can be placed on those lines or portion of those lines and can thus function rapidly as a go/no go test.

The data stimulus primitive is implemented at a lower level of operability of the μP than the bus test primitive, specifically by repeatedly resetting the μP; which function will have been tested prior to execution of the bus test primitive. Upon reset, the μP accesses the first location in the boot memory and retrieves the bit pattern stored there. The data stimulus is not a program but is executed by altering the bit pattern in the first location of the boot memory for each reset. It is significant to note that this function is common to both the so-called vectored reset and execute-on-reset types of microprocessors. With either type of μP, the bit pattern retrieved from memory will be communicated over the data bus and will appear on the address bus. During reset, a sync pulse is generated by the μP during the initial reading of the first location of the boot memory which is captured by the sync module, communicated to the pod and used to evaluate signals appearing on the data bus, either by probing or non-probing tests to collect data bus line signatures. The latter is done by a procedure similar to the bus test using an exhaustive data stimulus sequence of bit patterns while monitoring the chip select line. The data stimulus sequence is exhaustive in the sense that it consists of a series of essentially arbitrary patterns which are, nevertheless, chosen such that a unique signature will be generated on each line of the data bus. As noted in the description of the bus test primitive, done on the memory bootspace, the chip select line (which is a logic function of the high-order bits on the address bus) will reflect an error only if one or more of the high-order bits is non-zero as is expected when cycling through boot space locations and the go/no go test will be passed even if one or more of the high order bus lines are tied to ground. In the same way, the presence or absence of a chip select signal as expected while performing the data stimulus sequence will reflect whether or not one of the high order lines is latched (e.g. shorted to ground). If this test is passed, only tied line defects, where a line of the data bus is tied to another data bus line will remain. This can be later diagnosed by probing. However, in accordance with this invention it is preferable to validate the data bus at this point, whereby, if no faults are reported by the validation routine, the data bus will be known to be fully functional.

After testing or diagnosis of the data bus, testing of the address bus may be conducted using the same stimulus sequence as for the data stimulus primitive. However, this is done by conducting a programmed sequence of read/write instructions using these bit patterns and collecting signatures either with a probe, or preferably, in an analysis memory from which latched or tied lines may be deduced. As pointed out above, an exhaustive test of the address lines may be conducted using only the limited number of bit patterns in the stimulus sequence. Once the address bus lines have thus been fully diagnosed, full diagnosis of the data lines will be possible since any defect appearing on the databus lines will also be reflected on the address bus lines. Since the address bus lines have been fully diagnosed, any fault noted will be isolated to a particular bus. It is helpful to note that for execute-on-reset processors, the program for performing the address stimulus primitive can be a single instruction. For vectored reset processors, which look to the boot location address for the address of the first instruction, the address stimulus primitive typically requires no instructions at all; the desired bit pattern is merely placed into the emulation memory at the reset vector location.

Figure 3:
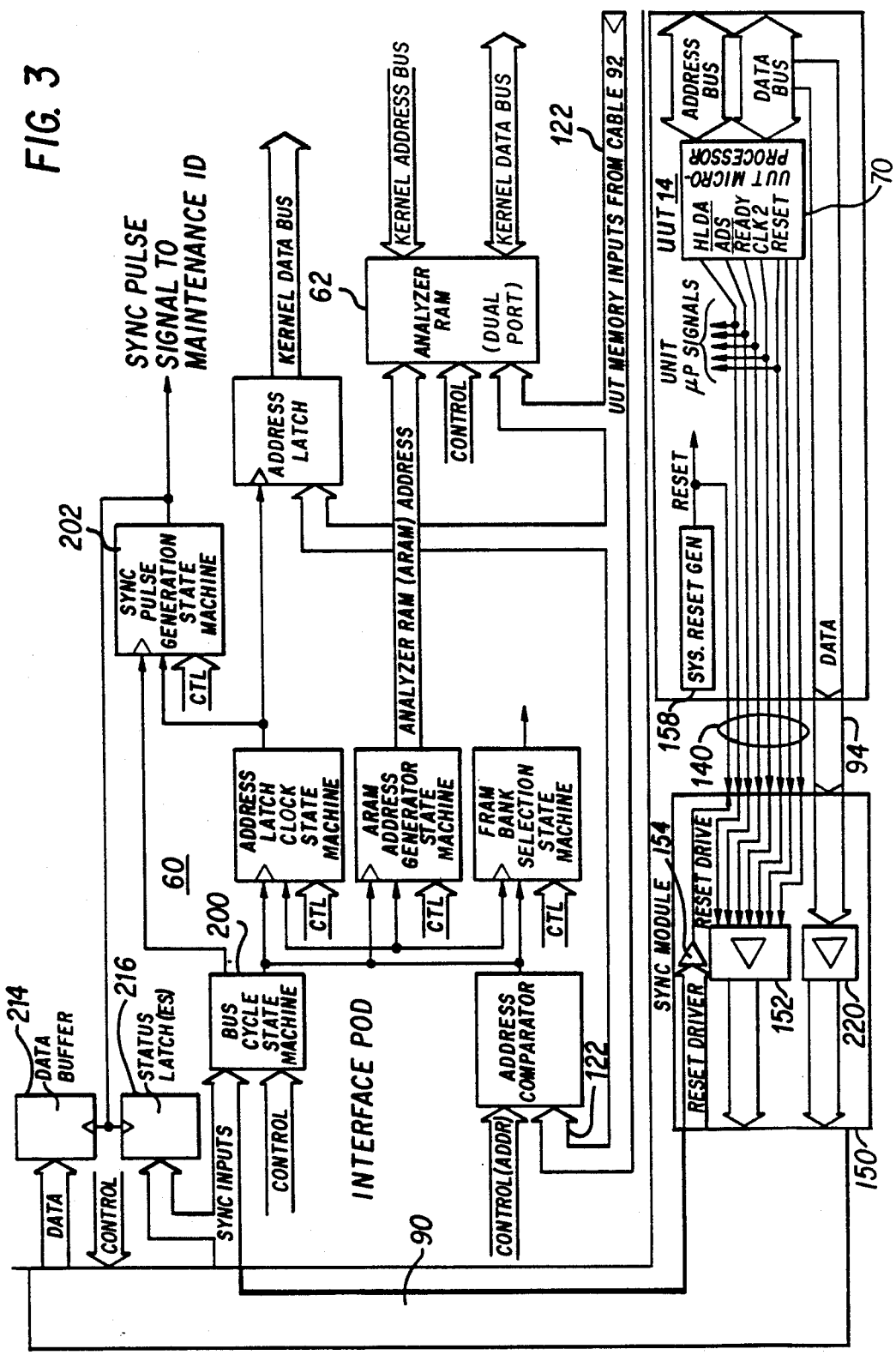
FIG. 3 is a detailed block diagram of the overall system as shown in FIG. 2.

To recapitulate the above summarized primitives in the context of the overall system and method, when it is desired to perform a test of the kernel of a μP-based system, an emulation memory is electrically substituted for the memory of the unit to be tested and a sync module is connected to timing information and forcing pins of the μP by conductors 140 (FIG. 3). When the test procedure is initiated, certain checks are made to ascertain that power is provided to elements of the kernel as will be enumerated in greater detail below. Then a reset overdrive check is performed to determine if the pod can, in fact, initiate a reset of the μP and is monitored by the sync module to determine if the reset line first goes active and then inactive. The actual reset of the μP is not checked in this step but only that a signal which should be capable of doing so is present at the appropriate pin of the μP.

Next, the sync module captures the clock signal of the μP which is evaluated. If the μP clock signal is not received by the pod, additional checks are made of the clock to determine if it is slow or shorted and for unexpected values of the signals on the forcing lines.

At this point, no tests have been performed on the μP itself but signals have been verified sufficiently to determine that such tests may now be done. The most rudimentary of these tests, the μP reset, is now done by overdriving the reset line and looking for a chip select signal on the chip select line corresponding to the boot memory location from address decoder 80. If successful, the μP will again be reset for the purpose of checking for the correct signal on the low order lines of the address bus to access the first location of the boot memory. This procedure will now have verified sufficient functionality of the kernel to proceed with the sequence of the bus test, and the sequence of data and address stimulus primitives as outlined above. It should be noted also that if any test conducted thus far has indicated a defect, a particular kernel fault will have been unambiguously indicated without requiring any more complex or high level function from the μP than reset. The bus test as outlined above, in its first (and possibly only) cycle will verify the only further function necessary to fully test and diagnose the remainder of the kernel: a read and write operation. It should also be kept in mind that because of the high resolution sync pulses produced by the sync module, bus cycles of interest can be isolated and evaluations of the buses can be conducted according to the signatures produced in response to the stimulus patterns imposed to exercise the lines. Since, for example, only twelve bit patterns, as disclosed in the Polstra et al application, incorporated supra, are necessary in a stimulus primitive in order to exercise thirty-two lines in a bus to develop a unique signature for each line for fully diagnosing the bus, significant increases in testing speed can be achieved.

Figure 4:
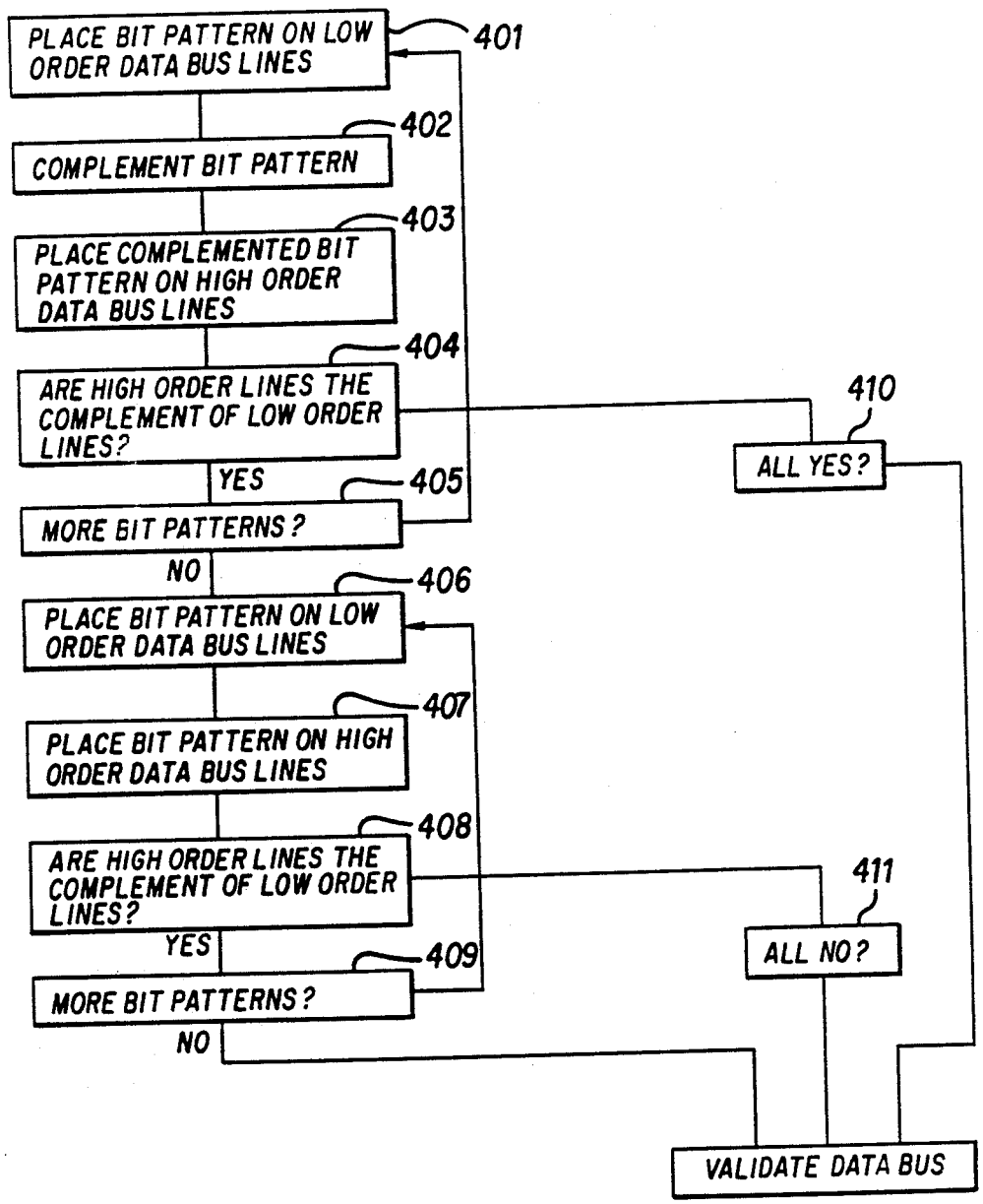
FIG. 4 is a flow diagram illustrating the function of the invention.

With specfic reference to FIG. 4, The data bus validation routine comprises the accessing of a bit pattern from the emulation memory and placing that pattern on a portion of the data bus (401). Then the complement of the bit pattern is preferably produced by the μP from the bit pattern (402) and placed on another portion of the data bus (403). A comparison of the two portions of the data bus are then compared (404) and a signal is generated if the two bit patterns are not complements of each other. This result can be immediately reported but is preferably collected (410) over a sequence of bit patterns. These steps are preferably repeated through a predetermined sequence of patterns. This sequence need not be conducted in a single series of operations but can be interrupted or interleaved with the similar series of steps 406-409.

The process of validation of the data bus is continued by placing a bit pattern, preferably from a second sequence of bit patterns, on a portion of the data bus (406). In this sequence, as distinct from the previous sequence, the same bit pattern is placed on a second portion of the data bus (407). Comparison is again made (408) and the result of the comparison is collected (411). These steps are then preferably repeated through the second sequence of patterns (409).

When both sequences have been completed, the collected comparison results 410 and 411 are evaluated and the data bus in considered to be validated if the first series reports all complements and the second series reports none.

In accordance with the invention and with reference again to FIG. 3, conductors 140 are connected to the reset line and other lines on which signals reflecting the operational state (status pins) of the UUT μP will appear. For example, on the 80386 processor, these lines will be the HOLD, HLDA (hold acknowledge), $\overline{ADS}$, $\overline{READY}$, CLK², and RESET lines. These signals will be received by buffers 152 over lines 140 and transmitted to the pod over cable 90 as inputs to bus cycle state machine 200. Bus cycle state machine 200 will perform a logical operation on these signals, under control of the mainframe 10, to develop a control signal for controlling sync pulse generation state machine 202 which generates a sync signal in response thereto. This sync signal is sent to mainframe 10 which generates control signals therefrom which are returned to various parts of the pod as illustrated, notably the analyzer RAM 62.

The mechanism for analyzing the address trace is the same one that is used for analyzing the trace from the Bus Test primitive. This is more fully described in the disclosure "AUTOMATIC VERIFICATION OF KERNEL CIRCUITRY BASED ON ANALYSIS OF MEMORY ACCESSES by J. Polstra and assigned to the assignee of this application, which is hereby incorporated by reference.

According to a preferred embodiment of the invention, ten bit patterns are used in each of two sequences. One sequence will force each of the bit patterns and its complement onto the full width of the data bus. These patterns (in HEX notation are preferably

| | |
|---|---|
| $FFFF0000 | $00FFFF00 |
| $0F0FF0F0 | $3333CCCC |
| $5555AAAA | $AAAA5555 |
| $CCCC3333 | $F0F00F0F |
| $FF0000FF | $0000FFFF. |

The other sequence will force each bit pattern and a true replication of that bit pattern onto the data bus in the same fashion. These patterns are preferably

| | |
|---|---|
| $FFFFFFFF | $00FF00FF |
| $0F0F0F0F | $33333333 |
| $55555555 | $AAAAAAAA |
| $CCCCCCCC | $F0F0F0F0 |
| $FF00FF00 | $00000000. |

These patterns are chosen to insure that all data line faults will be detected by at least one pattern. Faults which will be detected are, for example, lines stuck high or low and lines tied to other lines. Since the data bus will be validated only if all of the one sequence of patterns are reported as complementary high and low order bit pattern and none of the other sequence are reported as complementary high and low order bit patterns, it is also assured that no data bus line fault can be reported incorrectly as a pass.

This validation procedure is equally applicable to processors with 4 bit, 8 bit, 16 bit, 32 bit or any other width of data bus.

The 80386 Datatest Program

As an example of the application of the validation method and data structure according to the invention, The following example will apply the invention in detail to the testing of a kernel including a 80386 type processor. It should be borne in mind that this method and data structure is applicable to many different types of computers and digital circuits.

The program embodying the method and data structure of the invention is as follows:

| Data Lines | | | | |
|---|---|---|---|---|
| DDDDDDDDDDDDDDDDDDDDDDDDDDDDDDDD | | | | |
| 33222222222211111111110000000000 | | | | |
| 10987654321098765432109876543210 | Address | Label | Opcode | Operands |
| 10010000 | FFFFFFF0 | | nop | |
| XXXXXXXXXXXXXXXX10111000 | | | mov | ax,XXXXXXXXXXXXXXXX |
| 11010000 11110111 | FFFFFFF4 | | not | ax |
| 10010000 | | | nop | |
| 00110101 | | | xor | ax,YYYYYYYYYYYYYYYY |
| YYYYYYYYYYYYYYYY | FFFFFFF8 | | | |
| 01110100 11111110 | | success: | jz | success |
| 11111000000000111101001 | FFFFFFFC | | jmp | failure |
| | FFFFF800 | failure: | jmp | failure |

In the leftmost column, above, the listing shows the binary levels that will (in a good UUT) be present on the 32 lines of the data bus during each step of the program. As shown, the listing represents a UUT which actually utilizes all 32 data lines of the 80386. However, the test is, as noted above, effective for UUTs which utilize fewer data lines.

The "Address" column gives, in hexadecimal notation, the address being accessed by the UUT microprocessor at each step of the program. Each access fetches 32 bits=4 bytes of data over the data lines; that is why the addresses are spaced at intervals of 4 bytes.

The "Label" column gives an option symbolic name for the address of the current instruction. This is common practice in assembly language programming.

The "Opcode" column gives the symbolic name for an 80386 machine instruction.

The "Operands" column lists the operands (parameters) which more fully specify the precise action to be taken by the microprocessor.

Each instruction fetch transfers a full 32 bits of information across the data bus. Such a transfer may contain one or more full or partial 80386 instructions. For example, the first two instructions, "nop" and "mov ax,XXXXXXXXXXXXXXXX" together occupy the first 32 bits of data.

An instruction may also be split across two 32-bit transfers. This can be seen with the "xor ax,YYYYYY-YYYYYYYYYY" instruction, which begins in one set of 32 bits, but ends in another set.

A step-by-step description of the program is as follows:

1. nop

This is the 80386 "no operation instruction. It performs no function whatsoever with the microprocessor. It is used only to take up space so that the following instruction will fall on the desired portion of the data bus.

2. movax,XXXXXXXXXXXXXXXX

This is a "load immediate" instruction. Here, "XXXXXXXXXXXXXXXX" represents the upper 16 bits of the test pattern which is filled in by the pod. The effect of this instruction is to transfer the 16 bits into the processor's "ax" register. Notice that the pattern "XXXXXXXXXXXXXXXX" is transferred over data lines D16 through D31. This is intentionally accomplished by the preceding "nop" instruction.

3. notax

This is a "bitwise complement" instruction. It complements each of the bits in the "ax" register. After this instruction, the "ax" register contains the complement of the test pattern "XXXXXXXXXXXXXXXX".

4. nop

This is another "no operation" instruction, included to position the following instruction on the desired portion of the data bus.

5. xorax,YYYYYYYYYYYYYYYY

This is an "exclusive-or immediate" instruction. Here, "YYYYYYYYYYYYYYYY" represents the lower 16 bits of the test pattern which is filled in by the pod. The effect of this instruction is to combine the bits "YYYYYYYYYYYYYYYY" with the current contents of the "ax" register in a certain way. Namely, those bits of "ax" which were equal to the corresponding but of the pattern will receive a new value of 0; those bits which were unequal will receive a new value of 1. After this instruction is executed, "ax" will contain the value 0000000000000000 if and only if it previously contained the value "YYYYYYYYYYYYYYYY".

Prior to this instruction, "ax" contained the complement of the pattern "XXXXXXXXXXXXXXXX". So, if "YYYYYYYYYYYYYYYY" is precisely the complement of "XXXXXXXXXXXXXXXX", then this instruction will yield a result of zero. Otherwise, it will yield some nonzero value.

Notice that the pattern "YYYYYYYYYYYYYYYY" is transferred over data lines D00 through D15, the opposite half from that which was used to transfer the other pattern in step 2. This is intentionally accomplished by the preceding "nop" instruction.

6. jzsuccess

This is a "jump if zero" instruction. If the result of the previous instruction was zero (i.e., if the datatest passed), this instruction will jump to the address labeled "success." Otherwise (i.e., if the datatest failed), execution will continue with the subsequentially following instruction.

Note that "success" labels this very instruction. Thus, if the test passes, the processor will loop indefinitely, executing this "jump if zero" instruction.

7. jmpfailure

This is an "unconditional jump" instruction. It causes execution to continue with the instruction labeled "failure". Notice that the instruction labeled "failure" is at address FFFFF800, far away from the "success" address (which is between FFFFFFF8 and FFFFFFFC). This is intentional, as it allows the pod to determine whether the test passed or failed merely by examining the trace of addresses that were referenced.

8. failure: jmpfailure

This instruction causes the processor to perform an infinite loop at the failure address, namely FFFFF800.

When the program runs, the pod gathers a trace of the UUT's address references, using the Address RAM (ARAM). It then analyzes the sequences of address. If it sees a series of sequential accesses, followed by a jump back to the "success" address, then the pod knows that the test passed. If it sees anything else (usually, a jump to the "failure" address) the pod knows that the test failed.

Having thus fully described the invention in detail it will be appreciated that many variations and modifications will be apparent to persons skilled in the art without departing from the spirit and scope of the invention. The detailed description set forth above is intended as being by way of example and not of limitation; the scope of the invention being limited only by the appended claims.

We claim:

1. A method for validation of the data bus of a microprocessor based unit under test (UUT) comprising the steps of
   (a.) performing a load operation of a first bit pattern containing a number of bits equal to one-half the number of lines in at least a portion of said data bus over a first plurality of lines in said data bus,
   (b.) performing a load operation of a second bit pattern which is the complement of said first bit pattern over a second plurality of bus lines of said data bus lines,
   (c.) comparing said first and second bit patterns to determine whether said second bit pattern is the complement of said second bit pattern to determine if said second bit pattern is not the complement of said first bit pattern,
   (d.) performing a load operation of a third bit pattern containing a number of bits equal to one-half the number of lines in at least a portion of said data bus over a third plurality of lines in said data bus,
   (e.) performing a load operation of a fourth bit pattern which is not the complement of said third bit pattern over a fourth plurality of bus lines of said data bus lines,
   (f.) comparing said third and fourth bit patterns to determine if said fourth bit pattern is not the complement of said third bit pattern, and
   (g.) validating said data bus based upon the results of steps (c.) and (f.).

2. The method according to claim 1, wherein steps (c.) and steps (d.)–(f.) are repeated a sequence of times.

3. The method according to claim 2, wherein the first bit patterns for respective repetitions in said sequence are

| $FFFF0000 | $00FFFF00 |
| $0F0FF0F0 | $3333CCCC |
| $5555AAAA | $AAAA5555 |
| $CCCC3333 | $F0F00F0F |
| $FF0000FF | $0000FFFF. |

4. The method according to claim 2, wherein the third bit patterns for respective repetitions in said sequence are

| $FFFFFFFF | $00FF00FF |
| $0F0F0F0F | $33333333 |
| $55555555 | $AAAAAAAA |
| $CCCCCCCC | $F0F0F0F0 |
| $FF00FF00 | $00000000. |

5. the method recited in claim 1, wherein said fourth bit pattern is the same as said third bit pattern.

6. An apparatus for validation of the data bus of a micro-processor based unit under test (UUT) comprising:
   first means for forcing onto said data bus a first bit pattern containing a number of bits equal to one-half the number of lines in at least a portion of said data bus over a first plurality of lines in said data bus and forcing onto said data bus a second bit pattern which is the complement of said first bit pattern over a second plurality of bus lines of said data bus lines,
   second means for forcing onto said data bus a third bit pattern containing a number of bits equal to one-half the number of lines in at least a portion of said data bus over a third plurality of lines in said data bus and forcing of a fourth bit pattern which is not the complement of said third bit pattern over a fourth plurality of bus lines of said data bus lines,
   means for comparing said first and second bit patterns and comparing said third and fourth bit patterns and generating a signal if said second bit pattern is not the complement of said first bit pattern and if said fourth bit pattern is not the complement of said third bit pattern, and
   means for evaluating the signals produced by said means for comparing to validate said data bus.

7. The apparatus according to claim 6, wherein said means for forcing places each of a sequence of first bit patterns and each of a sequence of third bit patterns onto said data bus.

8. The apparatus according to claim 7, wherein the first bit patterns in said sequence are

| $FFFF0000 | $00FFFF00 |
| $0F0FF0F0 | $3333CCCC |
| $5555AAAA | $AAAA5555 |
| $CCCC3333 | $F0F00F0F |
| $FF0000FF | $0000FFFF. |

9. The apparatus according to claim 7, wherein the third bit patterns in said sequence are

| $FFFFFFFF | $00FF00FF |
| $0F0F0F0F | $33333333 |
| $55555555 | $AAAAAAAA |
| $CCCCCCCC | $F0F0F0F0 |
| $FF00FF00 | $00000000. |

10. The apparatus according to claim 6, wherein said fourth bit pattern is the same as said third bit pattern.

* * * * *